US009838649B2

(12) United States Patent
Nelson et al.

(10) Patent No.: US 9,838,649 B2
(45) Date of Patent: *Dec. 5, 2017

(54) END CAP ANALYTIC MONITORING METHOD AND APPARATUS

(71) Applicant: Target Brands, Inc., Minneapolis, MN (US)

(72) Inventors: Jaclyn Nelson, Las Vegas, NV (US); Neal DePape, Minneapolis, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 1160 days.

This patent is subject to a terminal disclaimer.

(21) Appl. No.: 13/932,441

(22) Filed: Jul. 1, 2013

(65) Prior Publication Data

US 2013/0335572 A1 Dec. 19, 2013

Related U.S. Application Data

(63) Continuation of application No. 12/203,267, filed on Sep. 3, 2008, now Pat. No. 8,502,869.

(51) Int. Cl.
*H04N 7/18* (2006.01)
*G06Q 30/02* (2012.01)

(52) U.S. Cl.
CPC .......... *H04N 7/18* (2013.01); *G06Q 30/0201* (2013.01)

(58) Field of Classification Search
CPC .................... H04N 7/18; G06Q 30/0201
See application file for complete search history.

(56) References Cited

U.S. PATENT DOCUMENTS

| | | |
|---|---|---|
| 6,625,310 B2 | 9/2003 | Lipton et al. |
| 6,816,184 B1 | 11/2004 | Brill et al. |
| 6,820,062 B1 | 11/2004 | Gupta et al. |
| 6,839,681 B1 | 1/2005 | Hotz |
| 7,023,469 B1 | 4/2006 | Olson |
| 7,221,367 B2 | 5/2007 | Cardno |
| 7,224,852 B2 | 5/2007 | Lipton et al. |
| 7,636,456 B2 | 12/2009 | Collins et al. |
| 7,868,912 B2 | 1/2011 | Venetianer et al. |
| 7,917,382 B2 | 3/2011 | Cereghini et al. |
| 7,957,565 B1 | 6/2011 | Sharma et al. |
| 8,009,863 B1* | 8/2011 | Sharma ............ G06K 9/00335 348/159 |
| 8,046,252 B2 | 10/2011 | Urano et al. |
| 8,170,909 B2 | 5/2012 | Brown et al. |

(Continued)

OTHER PUBLICATIONS

Senior, A. W., Brown, L. Hampapur, A., Shu, C. F., Zhai, Y., Feris, R.S., Tian, Y. L., Borger, S., Carlson, C., "Video Analytics for Retail", IBM T.J. Watson Research Center, 2007, 6 pages.

(Continued)

*Primary Examiner* — Dhairya A Patel
(74) *Attorney, Agent, or Firm* — Merek, Blackmon & Voorhees (57) ABSTRACT

Methods and apparatus for monitoring and ranking end caps in a store include video monitoring one or more parameters of end caps, including dwell times, item removal, traffic monitored parameters to determine for example one or more of end cap efficiency, product desirability, and location desirability.

15 Claims, 3 Drawing Sheets

(56) References Cited

U.S. PATENT DOCUMENTS

| | | | |
|---|---|---|---|
| 8,219,438 B1* | 7/2012 | Moon | G06Q 30/0201 705/7.29 |
| 2002/0082921 A1 | 6/2002 | Rankin | |
| 2003/0002712 A1* | 1/2003 | Steenburgh | G06K 9/00778 382/103 |
| 2004/0098298 A1 | 5/2004 | Yin | |
| 2004/0130620 A1 | 7/2004 | Buehler et al. | |
| 2005/0144066 A1* | 6/2005 | Cope | G06Q 30/02 705/14.25 |
| 2005/0162515 A1* | 7/2005 | Venetianer | G06F 17/3079 348/143 |
| 2005/0198661 A1* | 9/2005 | Collins | G09F 27/00 725/19 |
| 2005/0265582 A1 | 12/2005 | Buehler et al. | |
| 2006/0078047 A1 | 4/2006 | Shu et al. | |
| 2006/0190960 A1 | 8/2006 | Barker | |
| 2006/0192675 A1 | 8/2006 | Renkis | |
| 2006/0200378 A1 | 9/2006 | Sorensen | |
| 2007/0013776 A1 | 1/2007 | Venetianer et al. | |
| 2007/0016494 A1 | 1/2007 | Brown et al. | |
| 2007/0052803 A1 | 3/2007 | Chosak et al. | |
| 2007/0102512 A1* | 5/2007 | Doerwald | G06Q 10/087 235/383 |
| 2007/0291118 A1 | 12/2007 | Shu et al. | |
| 2008/0018738 A1* | 1/2008 | Lipton | G06K 9/00771 348/143 |
| 2008/0059521 A1 | 3/2008 | Hutson et al. | |
| 2008/0074496 A1 | 3/2008 | Venetianer et al. | |
| 2008/0189170 A1* | 8/2008 | Ramachandra | G06Q 30/0201 705/7.29 |
| 2008/0215462 A1 | 9/2008 | Sorensen et al. | |
| 2008/0249837 A1 | 10/2008 | Angell et al. | |
| 2008/0306756 A1* | 12/2008 | Sorensen | G06Q 30/02 705/27.1 |
| 2008/0306804 A1 | 12/2008 | Opdycke et al. | |
| 2009/0030780 A1* | 1/2009 | York | G06Q 30/02 705/14.41 |
| 2009/0083122 A1* | 3/2009 | Angell | G06Q 10/0631 705/7.33 |
| 2010/0026802 A1 | 2/2010 | Titus et al. | |
| 2011/0010266 A1 | 1/2011 | Edwards | |
| 2013/0039543 A1 | 2/2013 | Fuhr et al. | |

OTHER PUBLICATIONS

Grimm, Jacqueline, "Remote Video Monitoring", Diebold Inc., 2008, 5 pages.

* cited by examiner

END CAP ANALYTIC MONITORING METHOD AND APPARATUS

This Application is a continuation of and claims priority to U.S. patent application Ser. No. 12/203,267 filed on Sep. 3, 2008 entitled, "End Cap Analytic Monitoring Method and Apparatus" and incorporates that application herein by reference in its entirety.

FIELD

The present disclosure relates generally to video analytics, and in particular the present disclosure relates to use and function of analytics for end caps.

BACKGROUND

End caps in retail stores are those locations in the stores that are at the end of an aisle. End caps are often the location where featured items, such as sales items and very popular items, are located. End caps are used for popular or featured items because they typically have the highest amount of traffic flow past them, and shoppers may be influenced by a product on an end cap to seek out other items within the store that relate to the item on the end cap.

Further, certain items are displayed on end caps at certain locations where it is known that impulse-type purchases are typically made. Such end cap locations include for example end caps located at or near point of sale locations within the store.

The use of video monitoring and video analytics in a retail store environment is becoming increasingly popular. Video monitoring is used for a number of purposes, including but not limited to security monitoring, store personnel compliance monitoring, troubleshooting monitoring, and the like.

Video monitoring is also used for determining conditions within a store, or for monitoring traffic flow and traffic patterns of shoppers through the store. For example, fixed cameras using video analytics can determine how many shoppers pas a certain point, and can also determine the direction of travel for the shoppers. Further, areas of interest within video frames can be determined and monitored using video analytics. Such areas of interest include a shelf or shelves, or the like. Video analytics can be used to determine whether a shopper has reached into a shelf area or removed a product or products from the shelf.

Other video analytics can determine whether or when a shopper stops at a certain point of interest, and can determine how long the shopper stays at the location at which the shopper has stopped. This may be referred to as a dwell time or loitering analytic. Such analytics provide information about timing of purchases and the like.

Individual video analytics can be used for very specific purposes, such as monitoring entry to and exit from a store, product removal, loitering, traffic patterns, and the like. While analytics that determine whether a shopper or guest is loitering in a certain location can be useful for purposes of calling for assistance automatically or identifying a potential theft threat at the certain location, the uses of a single analytic are limited to specific tasks.

For the reasons stated above, and for other reasons stated below which will become apparent to those skilled in the art upon reading and understanding the present specification, there is a need in the art for video monitoring and evaluation of end caps in stores.

SUMMARY

A method of analyzing video includes determining an average dwell time of customers at a number of particular locations within a store, where each of the particular locations has a particular item associated with it, and ranking each of the particular locations based on an average dwell time of a customer at each of the particular locations.

In another embodiment, a method of monitoring video data for a retail store includes tracking with a video camera for each of a number of end caps a total number of guests who pass by the end cap, tracking for each end cap a first subset of the total number of guests who loiter at the end cap, determining an average loiter time for each of the end caps, and ranking the end caps according to the average loiter time.

In yet another embodiment, a video monitoring system includes a number of video cameras directed at a number of particular locations, and a controller electrically coupled to the video cameras. The controller is configured to determine an average dwell time of customers at each particular location, and to rank each of the particular locations based on an average dwell time at the particular locations.

Other embodiments are described and claimed.

DETAILED DESCRIPTION

In the following detailed description of the embodiments, reference is made to the accompanying drawings that form a part hereof. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present disclosure is defined only by the appended claims, along with the full scope of equivalents to which such claims are entitled. Data presented in the tables herein may or may not represent actual data, and that data is used only by way of example to show how the various methods can be employed.

In one embodiment, coupling information obtained using video monitoring on loitering or dwell time at specific identified locations, e.g., end caps, with information on one or more of object removal, point of sale data, and receipts, a retail store can generate large amounts of information specific to end caps. This information includes, but is not limited to, effectiveness of end caps with respect to their location within a store, desirability of products placed on end caps, ancillary items that may be purchased upon purchase of an item at an end cap, conversion rates for products and end caps, and the like.

Figure 1:
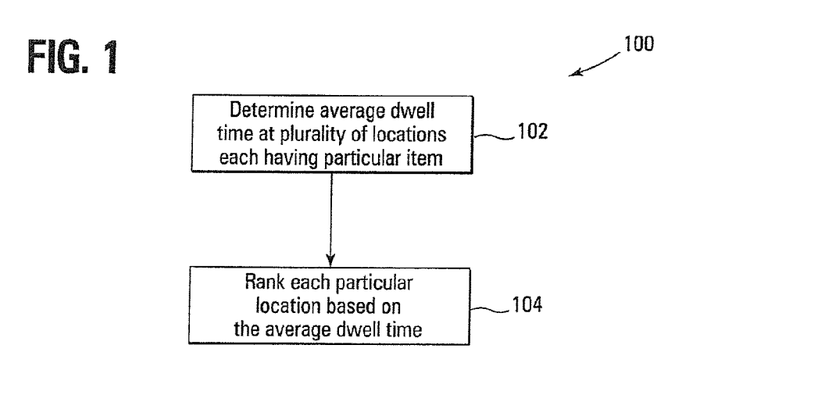
FIG. 1 is a flowchart diagram of a method according to one embodiment of the present disclosure.

A flowchart of a method 100 of analyzing video data according to one embodiment is shown in FIG. 1. Method 100 comprises determining, in block 102, an average dwell time of customers at a plurality of particular locations within a store, using a plurality of video cameras directed at the plurality of particular locations, where each of the plurality of particular locations has a particular item, and ranking each of the particular locations based on the average dwell time at each of the particular locations in block 104. Dwelling (also referred to as loitering) for the purposes of this application means stopping or substantially stopping at a particular location. For example, substantially stopping may include slowing down substantially without fully stopping, or standing substantially still while still technically moving. A dwell time (also referred to as a loiter time) is an amount of time a customer remains at the particular location.

Figure 2:
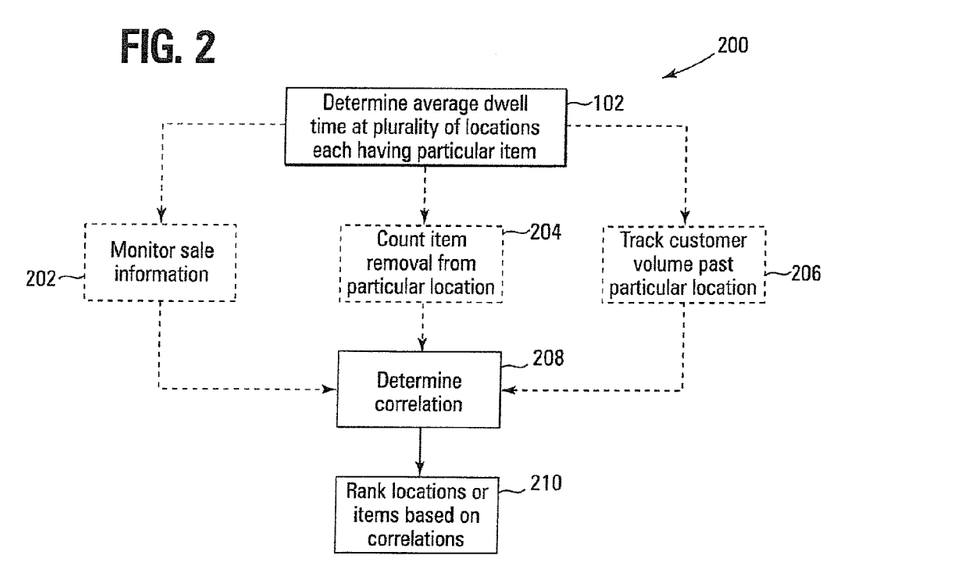
FIG. 2 is a flowchart diagram of a method according to another embodiment of the present disclosure.

In alternative methods, shown in greater detail in flowchart 200 of FIG. 2, one or more additional pieces of information are gathered by the video cameras and analyzed by video analytic software for each of the plurality of particular locations. For example, in one embodiment, sale information for each of the items at each of the particular locations is monitored in optional block 202. This sale information is used in one embodiment to determine a correlation (generally shown at block 208) between the average determined dwell time of customers who dwell at a particular location and the sales associated with that particular item.

In another embodiment, a number of removals of each particular item from each particular location is also tracked at optional block 204. This information is used in this embodiment to determine a correlation (generally shown at block 208) between the average dwell time of customers who dwell at a particular location and the number of items removed from the particular location associated with that particular item.

In another embodiment, customer volume moving past a particular location is tracked at optional block 206. This information may be used with one or more of sale information and item removal tracked in optional blocks 202 and 204 to determine a correlation (generally shown at block 208) between traffic volume past a particular location and sales or item removals.

In various other embodiments, two or more of the patterns tracked in optional blocks 202, 204, and 206 are combined to determine the correlation shown generally at block 208. For example, traffic flow past a particular location can be correlated with average dwell time for the particular location to determine effectiveness of the particular location, the item for sale at the location, or both. Further, any number of determinations can be made based on particular locations, items for sale at the locations, average dwell time at particular locations, traffic volume moving past particular locations, sales information for items for sale at particular locations, items removed from particular locations, and the like. Choice of the particular patterns or data to be correlated is made based on what the desired determination is. In another example, a different set of patterns are correlated for determination of effectiveness of a particular location for determination of the attractiveness of an item at a location. By choosing appropriate combinations for the various correlations, appropriate determinations can be made.

In yet another embodiment, combinations are made and further outside information is also used. For example, using information about the time a customer dwells at a particular location, combined with item removal from the particular location within a certain time period within the dwell time, may allow a gauge of product desirability.

Once a desired correlation or combination of correlations is made in block 208, particular locations or items at those particular locations are ranked in block 210. The ranking may be based on the correlations or combinations thereof. For example, certain correlations or combinations thereof help to determine effectiveness of the particular locations regardless of the items that are for sale at the particular locations, whereas other correlations or combinations thereof help to determine effectiveness of the product for sale regardless of its particular location.

Correlations are determined in various ways, depending upon what trend or pattern is desired to be determined. Once identification of basic information, such as how long a customer dwells or loiters at a location, the volume of traffic passing the location, whether an item is removed from the location, how long it takes to remove an item from the shelf once someone loiters or dwells at the location, and the like, is made, the basic information can be combined with sales information based on stock keeping unit (SKU) data for items located on end caps. For example, correlations can be made to determine whether an end cap location or a product stocked on the end cap drives sales, and to what extent. This information can be used to rank end caps on the basis of desirability, profitability, and the like, by layering data points for the various information to remove certain influences such as influences due to specific products or specific locations.

For one example of such a determination, traffic volume and average dwell time at a particular end cap displaying for sale a first brand of chips is obtained for a first predetermined period, for example two weeks, as represented by the representative sample data in Table 1. Then traffic volume and average dwell time at the same particular end cap displaying for sale a second brand of chips is obtained for a second predetermined period of the same duration as the first predetermined period. Using sales numbers for each end cap chip product for its predetermined time period, an analysis can be made as follows. For the situation shown in the first two rows of Table 1, the first brand of chips averages 50 shoppers per day who stop at the end cap, generating an average sales volume of 10 bags of chips per day, whereas the second brand of chips averages 50 shoppers per day who stop at the end cap, generating an average sales volume of 30 bags of chips per day. In this situation, a conversion rate (sales per shopper) for the first brand of chips is 20%, whereas the conversion rate for the second brand of chips is 60%. This indicates, absent other factors, that the second brand of chips is preferred, since the same shopper volume yields higher sales.

For a second situation shown in the last two rows of Table 1, the first brand of chips averages 50 shoppers per day who stop at the end cap, generating an average sales volume of 10 bags of chips per day, whereas the second brand of chips averages 500 shoppers per day who stop at the end cap, generating an average sales volume of 100 bags of chips per day. In this situation, a conversion rate (sales per shopper) for the both brands of chips is 20%, but the higher volume of shoppers for the second brand of chips indicates, absent other factors, that the second brand of chips is preferred, since the same end cap yields higher shopper volume. Including total traffic volume at the end cap for each product can yield further correlations, as can including other individual determinations, such as those discussed elsewhere herein.

TABLE 1

| Item | Dwellers volume per day | Sales | Conversion Rate (%) |
|---|---|---|---|
| Chip brand 1 | 50 | 10 | 20 |
| Chip brand 2 | 50 | 30 | 60 |
| Chip brand 1 | 50 | 10 | 20 |
| Chip brand 2 | 500 | 100 | 20 |

In another situation, traffic volume and average dwell time at a first end cap displaying for sale a certain brand of chips is obtained for a first predetermined period, for example two weeks, as represented by the representative sample data shown in Table 2. Then, traffic volume and average dwell time at a second end cap displaying for sale the same particular brand of chips is obtained for a second predetermined period of the same duration as the first predetermined period. Using sales numbers for the certain brand of chips at each of the two end caps for its predetermined time period, an analysis can be made as follows. For the situation shown in the first two rows of Table 2, the certain brand of chips averages 50 shoppers per day who stop at the first end cap, generating an average sales volume of 10 bags of chips per day, whereas the second end cap averages 500 shoppers per day who stop at the second end cap, generating an average sales volume of 100 bags of chips per day. In this situation, a conversion rate (sales per shopper) for the certain brand of chips is 20% at each end cap, whereas the traffic volume is 10 times higher for the second end cap. This indicates, absent other factors, that the second end cap is in a preferred location, since the same product yields higher traffic at the second end cap.

For a second situation shown in the last two rows of Table 2, the certain brand of chips averages 50 shoppers per day who stop at the first end cap, generating an average sales volume of 10 bags of chips per day, whereas the certain brand of chips averages 50 shoppers per day who stop at the second end cap, generating an average sales volume of 30 bags of chips per day. In this situation, a conversion rate (sales per shopper) for the certain brands of chips is 20% at the first end cap, and 60% at the second end cap. This indicates, absent other factors, that the second end cap may influence shoppers to buy more product than they normally would, indicating an end cap preference for the second end cap.

TABLE 2

| Location | Dwellers volume per day | Sales | Conversion Rate (%) |
|---|---|---|---|
| End cap 1 | 50 | 10 | 20 |
| End cap 2 | 500 | 100 | 20 |
| End cap 1 | 50 | 10 | 20 |
| End cap 2 | 50 | 30 | 60 |

In another example, an advertisement is placed into local print media for a particular product, and guest (or customer) behavior is monitored for the week prior to the advertisement, the week of the advertisement, and the week after the advertisement. Purchase data is gathered for items covered in the advertisement, as represented by the representative sample data shown in Table 3, which shows a day of the week for all three weeks, a total number of shoppers who dwelled at the particular product location for at least a predetermined time, purchase information for the particular product, and a percentage of those shoppers who dwelled at the particular product location who purchased the product, all by way of example to assist in showing application of the method. Comparing numbers of shoppers who dwell at the product can indicate whether the advertisement was effective in bringing more browsers to the product, and potentially how effective. In the sample data, Tuesday dwelling shoppers in the pre-advertisement week total 89, Tuesday dwelling shoppers in the advertisement week total 142, and Tuesday dwelling shoppers in the post-advertisement week total 89. Of those dwelling shoppers, 7 products are purchased in the pre-advertisement week for a conversion rate of 8%, 14 products are purchased in the advertisement week for a conversion rate of 10%, and 6 products are purchased in the post advertisement week for a conversion rate of 7%. The effectiveness of the advertisement or the pricing of the item is indicated by the correlation of higher shopper dwelling volume and higher conversion rates for the product in the advertisement week.

TABLE 3

| Time | Day of week | Dwellers | Purchases | Conversion Rate (%) |
|---|---|---|---|---|
| Pre-Ad | Sunday | 45 | 3 | 7 |
| Pre-Ad | Monday | 100 | 7 | 7 |
| Pre-Ad | Tuesday | 89 | 7 | 8 |
| Pre-Ad | Wednesday | 101 | 7 | 7 |
| Pre-Ad | Thursday | 104 | 8 | 8 |
| Pre-Ad | Friday | 107 | 8 | 7 |
| Pre-Ad | Saturday | 89 | 6 | 7 |
| Ad | Sunday | 99 | 13 | 13 |
| Ad | Monday | 135 | 18 | 13 |
| Ad | Tuesday | 142 | 14 | 10 |
| Ad | Wednesday | 119 | 12 | 10 |
| Ad | Thursday | 110 | 14 | 13 |
| Ad | Friday | 113 | 22 | 19 |
| Ad | Saturday | 78 | 14 | 18 |
| Post-Ad | Sunday | 37 | 7 | 19 |
| Post-Ad | Monday | 102 | 8 | 8 |
| Post-Ad | Tuesday | 89 | 6 | 7 |
| Post-Ad | Wednesday | 88 | 6 | 7 |
| Post-Ad | Thursday | 101 | 6 | 6 |
| Post-Ad | Friday | 109 | 8 | 7 |
| Post-Ad | Saturday | 64 | 7 | 11 |
| Total Pre-Ad | | 635 | 46 | 7 |
| Total Ad | | 796 | 107 | 13 |
| Total Post-Ad | | 590 | 48 | 8 |

Further combinations of individual determinations will be evident to those of skill in the art, and are within the scope of the disclosure. For example, an average dwell time at an end cap can indicate what types of products are likely to sell at that end cap, but a combination of average dwell times and conversion rates can be used to show statistically which end caps are suitable for short-decision-time products versus long- or longer-decision-time products.

In one embodiment, to determine an average dwell time (as shown in block 102 of FIG. 1) for customers who dwell at a particular location, a determination is first made as to whether the customer is actually dwelling at the particular location. This determination process 102 is shown in flowchart form in FIG. 3. Method 102 comprises determining, for some or all of the plurality of particular locations, whether a customer dwells for a predetermined particular amount of time in decision block 302. If the customer has remained at the location, i.e., dwelled, for at least the predetermined time, the customer is counted and included in the calculation of average dwell time in block 304. If not, the customer is ignored in the calculation of average dwell time in block 306. In this embodiment, then, the dwell time used in the determination of an average dwell time in block 304 applies only to those customers who remain at the particular location for the predetermined particular amount of time.

This particular amount of time may be set depending upon a known likelihood for purchase based on specific item information or the like.

In further embodiments, not only are traffic volume, dwell time, sales information, and/or item removal determined and correlated, but also given improving quality of video analytics, a determination may be made to ignore certain statistics or patterns related to dwell times when video analytics show that the dwelling of a customer at a particular location does not correlate with dwelling for the purposes of evaluation of the product, but instead is for a different purpose. For example, if a customer stops at a particular location, a typical dwell-time algorithm will identify that dwell instance as one that is for the purpose of evaluating the product at the particular location for a potential purchase. However, if the customer is actually facing away form the particular location and not directly facing the item, the stop at that particular location may in fact be for a purpose other than evaluation of the item at the particular location. In one embodiment, a determination is made to ignore a customer dwelling at a particular location when the customer does not face the particular location, but is instead facing in a different direction.

Figure 3:
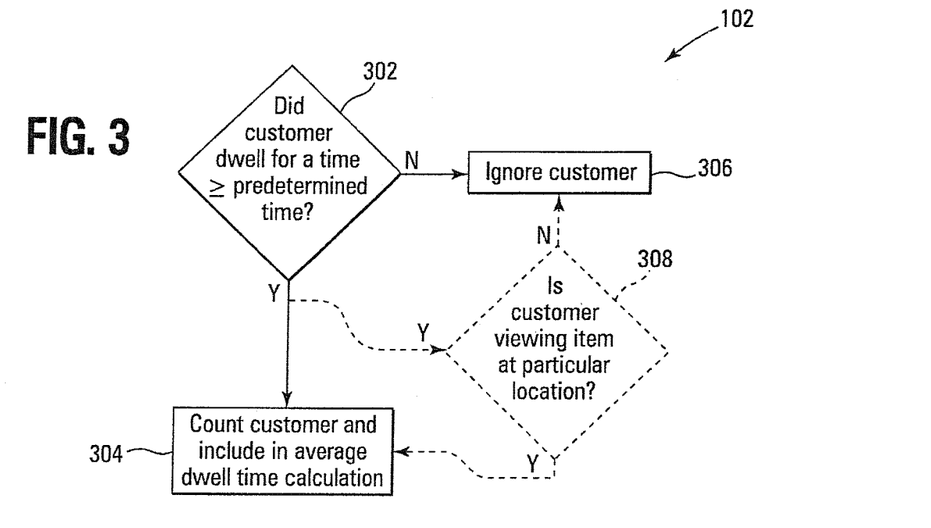
FIG. 3 is a flowchart diagram detailing a method of determining an average dwell time according to another embodiment of the present disclosure.

Optionally, if a customer has dwelled at the particular location for a time period at least equal to the predetermined time, a decision is made in optional decision block 308 as to whether the customer is viewing the item at the particular location or is dwelling for a reason unrelated to the particular location. If the customer is viewing the item at the particular location, the customer is counted and included in the calculation of average dwell time in block 304. If not, the customer is ignored in the calculation of average dwell time in block 306. In this embodiment, then, the dwell time for determining an average dwell time in block 304 applies only to those customers who remain at the particular location for the predetermined particular amount of time and who are determined to be viewing an item at the particular location.

Alternatively, both determinations, that is, all those who dwell at a particular location for at least the predetermined time, and the subset of all those who dwelled for at least the predetermined time and who were viewing an item at the particular location, may be included in the calculation of average dwell time in block 306. This is another pattern that can be used in determining correlations as described above with respect to FIGS. 1 and 2.

Figure 4:
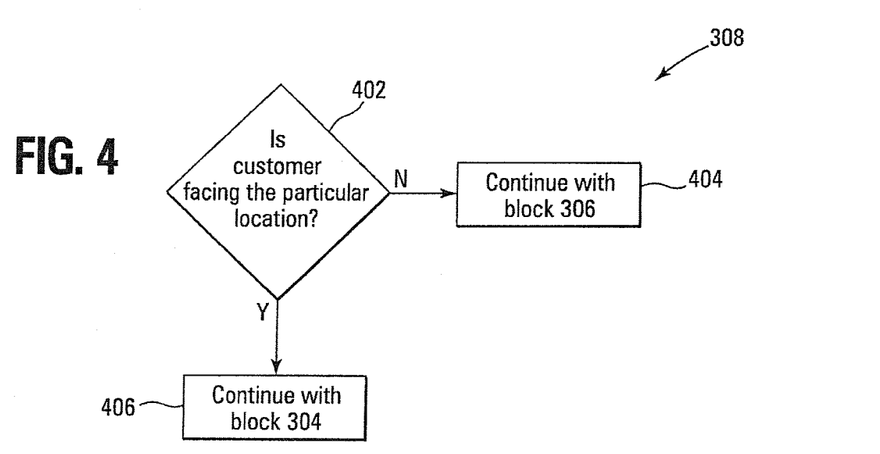
FIG. 4 is a flowchart diagram detailing a method of determining whether a customer is viewing a particular location according to another embodiment of the present disclosure.

In one embodiment, the process by which a decision is made (block 308) as to whether a customer is viewing an item at the particular location is shown in greater detail in FIG. 4. In FIG. 4, a decision is made in block 402 as to whether the customer is facing toward the particular item at the particular location. If the customer is not facing the particular location, process flow continues at block 404. If the customer is facing the particular location, process flow continues at block 406. Each customer not facing the particular location is ignored.

Determination of whether a customer is facing the particular item or is facing away from the particular item may be performed in various different ways and using various different methods without departing from the scope of the disclosure. For example, in one embodiment, video monitoring determines a direction of travel for an person moving into the vicinity of the end cap, identifies a face region for the person, for example, using facial recognition software, standard profiles of where a face on a person in the video is most likely to be, or the like, and determines, given the face region and the direction of travel, an initial orientation of the person. If the person stops, facial recognition can determine whether the person's identified face region is facing the end cap or is facing away from the end cap. If the person's identified face region is facing the end cap, then loitering is determined to be for the purposes of evaluation of the item at the end cap, provided the person dwells or loiters at the end cap for a minimum time that meets the threshold set for determining whether the person is dwelling or loitering at the end cap. While examples of determining whether a guest is dwelling at the end cap for the purposes of evaluation of the item at the end cap have been described, it should be understood that other methods may be used, and that improved video identification of persons within a camera view may make identification easier.

In the various embodiments described herein, the particular locations discussed may be end caps in retail stores. End caps usually generate the highest traffic flow in typical retail stores, and often items of particular interest are displayed on end caps.

In one embodiment, the various processes described herein are used for evaluation of end caps in a retail store. Specifically, end caps typically have the highest exposure within a retail store. They have the most customer traffic volume past them, and they generate the most time spent (highest amount of dwell time) at their locations with respect to other locations within a store. For any given end cap or subset of a plurality of end caps within a store, up to and including the entire set of end caps within a store, the embodiments of the present invention allow monitoring and tracking not only of the number of guests that pass by a certain end cap, but also the amount of time those guests who stop at the end cap for a period of time spend, how many items are removed from the end cap shelf and after what average amount of time, also what purchases were made in conjunction with the end cap item, where the guest goes next after dwelling at the end cap for a certain time period, etc., and including combinations thereof.

For end cap monitoring, a combination of video analytics as discussed generally above, including by way of example and not by way of limitation a dwell time analytic, an item removal analytic, and a traffic pattern and volume analytic are combined to generate marketing, effectiveness, and/or sales information regarding each end cap. Such marketing information includes but is not limited to correlations between traffic volume at a certain end cap and purchase information for items at that certain end cap, between dwell time at a certain end cap and purchases of items at that certain end cap, between end cap location and purchases at that particular end cap, between end cap average dwell time and purchases of items from that end cap, and the like. Given knowledge of traffic volume, dwell times, item removal from shelves, end cap position or location, items actually on an end cap, and/or purchases of those items, evaluations of effectiveness of end caps, including which end caps most reliably create sales, etc., can be used to rank end caps based on any number of factors or combinations thereof.

Specific examples of operation of the various embodiments of the present disclosure include evaluation of competing products. For end caps with items that may compete with other similar items, for example competing video game consoles, determination of traffic volume, dwell times, correlated purchases, and the like can also provide concrete data to counter an allegation from a manufacturer that its product was not displayed correctly, or that its product was not given equal representation at the store. With a knowledge of traffic volume and comparisons for end caps, issues of complaints can be effectively dealt with. For example, if similar products (products A and B) are placed at adjacent end caps, and the products generate an equal or substantially equal traffic volume past their respective end caps, then sales of product A exceeding product B may be shown to be due to the quality or pricing of product A and not due to its placement within the store. Similarly, if product B outsells product A, an average dwell time at the location of product B higher than that of product A may indicate more general interest in product B than in product A. Combinations of the determinations and calculations of the various embodiments of the present disclosure that are not discussed herein will be apparent to those of skill in the art, and are within the scope of the disclosure.

Another example of the application of the various embodiments of the present disclosure includes application to specialized subsets of end caps. For example, end caps near point of sale (POS) locations, e.g., sales register lines, are typically used to sell items that may be identified as impulse-buy or short-decision-to-buy items. Dwelling times and average dwelling times determined for end caps at POS locations are in one embodiment correlated with sales of those items at the POS end caps, either within a certain time period, or overall, to allow a ranking of items that sell most readily at POS end caps. Further, if dwell times are high and sales low, a different product, different selection of product (different DVDs or the like), and/or better pricing may be indicated. For example, if average dwell time for a POS end cap is high for DVDs, but sales are low, a different selection of DVDs may be made.

Still further, the embodiments of the present disclosure are used in various other embodiments to show where customers go after they leave an end cap. This can be done, for example, by correlating sales of related items to dwell times, item removal, and other determinations and calculations described above. In one example, product C at a particular end cap may be a product that requires batteries to operate. Placing batteries in close proximity to the end cap may drive purchasers to batteries. Determination of a direction of customer travel after the customer dwells at the end cap for product C, correlated with sales of product C and batteries, gives yet another indication of effectiveness of the end cap, and allows ranking thereof. This may be applied to other ancillary or secondary items related to a product at an end cap, such as chips and dips placed between an end cap selling chip/dip platters and the stores POS locations.

Another application of the various embodiments of the present disclosure allows a ranking of end caps within a store from a standpoint of desirability regardless of product. Typical evaluation of the effectiveness of end caps and whether such effectiveness is due to the product on the end cap or the actual physical location of the end cap have often been based on estimations based on personal observation. With the embodiments of the present disclosure, the element of guesswork is removed. Correlations made from the data collected and calculated allow evaluations of end cap effectiveness to be made to determine logically whether it is product, location, or a combination thereof that makes for an effective end cap. A ranking of end caps based on location allows for high-margin or very popular items to be placed in order to improve sales or improve customer satisfaction with store layout and accessibility.

Figure 5:
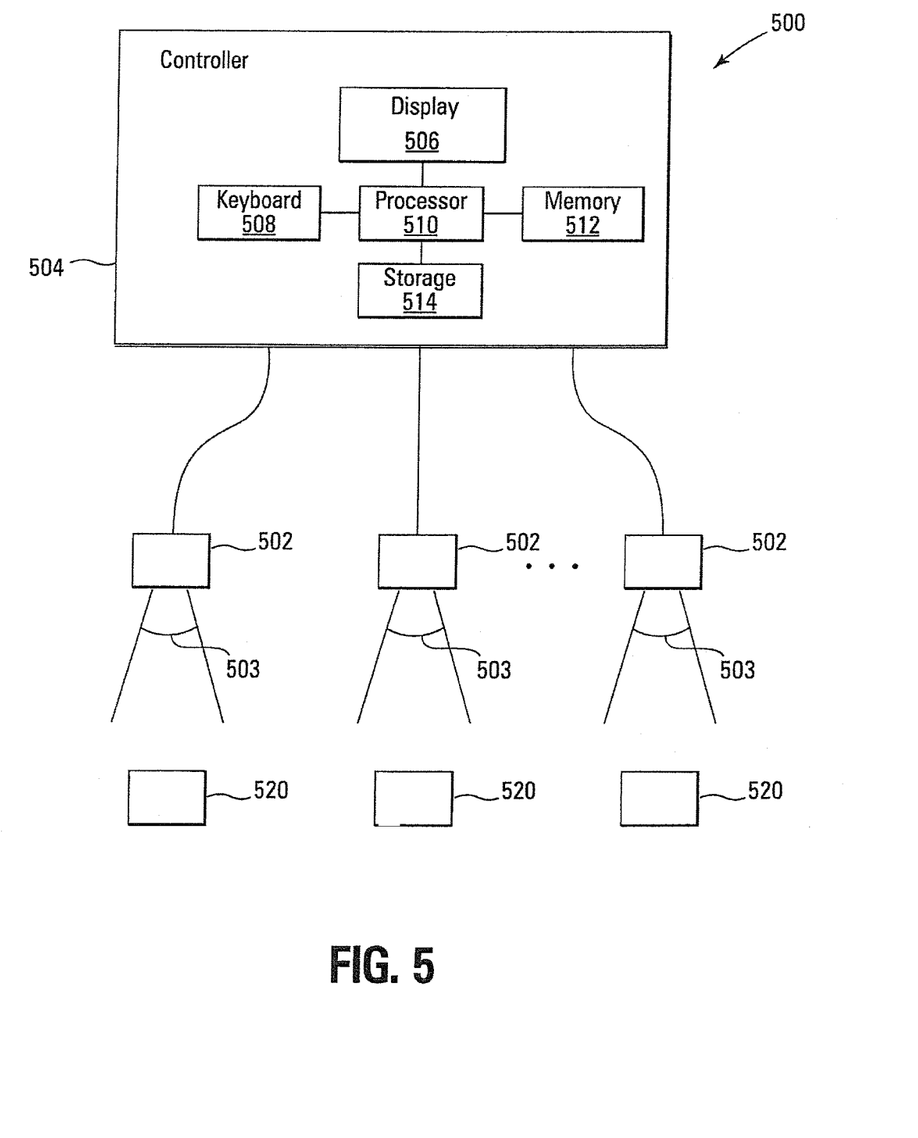
FIG. 5 is a block diagram of a system according to another embodiment of the present disclosure.

A video monitoring system 500 according to another embodiment of the present disclosure is shown in block diagram form in FIG. 5. FIG. 5 shows a video monitoring system 500, such as may be used for video surveillance, according to one embodiment. For one embodiment, video monitoring system 500 includes a plurality of video cameras 502 electrically coupled to a controller 504, such as a master video server. Video cameras 502 are respectively directed at end caps of a facility, such as a retail store, etc.

Controller 504 and video cameras 502 may be coupled to each other over a network, such as a local area network (LAN). For one embodiment, controller 504 may provide an interface for a user to interact with video cameras 502. For another embodiment, controller 504 may be a computer, such as personal computer, e.g., with a video display 506. Controller 504 may also include a keyboard 508 for inputting information into controller 504, and a pointing device (not shown), such as a "mouse," for controlling a cursor displayed on video display 506.

For one embodiment, controller 504 includes processor 510 for processing computer-readable instructions. These computer-readable instructions are stored in a memory 512, such as a computer-usable media, and may be in the form of software, firmware, or hardware. The computer-readable instructions configure controller 504 to perform the operations and methods of the various embodiments of the present invention described herein.

In a hardware solution, the computer-readable instructions may be hard coded as part of processor 510, e.g., an application-specific integrated circuit (ASIC) chip. In a software or firmware solution, the instructions are stored for retrieval by the processor 510. Some additional examples of computer-usable media include static or dynamic random access memory (SRAM or DRAM), read-only memory (ROM), electrically-erasable programmable ROM (EEPROM or flash memory), magnetic media and optical media, whether permanent or removable. Most consumer-oriented computer applications are software solutions provided to the user on some form of removable computer-usable media, such as a compact disc read-only memory (CD-ROM) or digital video disc (DVD). For another embodiment, controller 504 may include a storage device 514, such as a hard drive, removable flash memory, etc., for storing image data corresponding to video images captured by video cameras 502.

Cameras 502 each have a field of view designated as 503. Each of cameras 502 is in one embodiment directed toward an end cap 520 such as those described above (sometimes referred to as particular locations). The various process embodiments described above with respect to FIGS. 1, 2, 3, and/or 4 are amenable to operation within system 500 to allow system 500 to perform the methods described therein.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for determining the effectiveness of product locations in a retail store, comprising the steps of:

directing a plurality of video cameras at predetermined locations in a retail store to collect video data relating to customer behavior including data relating to dwell times of customers at the predetermined locations;

determining for a first predetermined period of time an average dwell time of customers at the predetermined locations within the retail store using a plurality of video cameras directed at the predetermined locations, each of the predetermined locations having on display a product for sale, ranking each of the predetermined locations based on a correlation between the average dwell time by customers at the predetermined locations and sales information for the product for sale at each of the predetermined locations, changing the product for sale displayed at each of the predetermined locations at the expiration of the first predetermined period of time, determining for a second predetermined period of time a second average dwell time of customers at the predetermined locations within the retail store using the plurality of video cameras directed at the predetermined locations;

ranking each of the predetermined locations based on a correlation between the second average dwell time by customers at each of the predetermined locations and sales information for the product for sale at each of the predetermined locations during the second predetermined period of time; and comparing sales of the products at the predetermined locations during the first predetermined period of time to the sales of products at the predetermined locations during the second predetermined period of time to determine the effectiveness of the predetermined locations on sales of the products;

determining by using facial recognition software on the collected video data for each customer who dwells at at least one of the predetermined locations during each of the first predetermined period of time and the second predetermined period of time whether the customer is viewing the product for sale at the predetermined locations or is dwelling for a reason unrelated to the product for sale at the predetermined locations; and ignoring each customer dwelling for a reason unrelated to the product for sale in determining the average dwell time.

2. The method of claim 1, wherein ranking each of the predetermined locations further comprises determining a correlation between the average dwell time at each of the predetermined locations and a quantity of the product for sale removed from each of the predetermined locations.

3. The method of claim 1, and further comprising the step of using the video data to track a volume of customer traffic at each of the predetermined locations.

4. The method of claim 3, wherein determining an average dwell time further comprises determining for each of the predetermined locations a location average dwell time for each customer of a volume of customer traffic who dwells at the at least one of the predetermined locations for at least a certain period of time.

5. The method of claim 4, further comprising the step of:
determining whether the customer is viewing the product for sale at the predetermined location and identifying whether the customer is facing toward the product for sale at the predetermined location, and ignoring each customer not facing toward the product for sale in determining the location average dwell time.

6. The method of claim 1, wherein determining the average dwell time of customers at the predetermined locations within a store further comprises determining a dwell time for customers at a plurality of end caps of a retail store.

7. The method of claim 1, further comprising the steps of:
placing a first product for sale at a first one of said predetermined locations for said first predetermined period of time;
placing a second product for sale at said first one of said predetermined locations for said second predetermined period of time, wherein said first product is a competitive product to said second product; and
comparing sales of said first product with said second product during said first predetermined period of time and during said second predetermined period of time.

8. The method of claim 1, further comprising the steps of:
monitoring using the video cameras during each of the first and the second predetermined periods of time and collecting video data on a number of removals of the product for sale at each of the predetermined locations.

9. The method of claim 1, further comprising the step of:
calculating a conversion factor for each of the predetermined locations during each of the first predetermined period of time and the second predetermined period of time based on the comparison of customers dwelling at each of the predetermined locations and sales of a product displayed at each of the predetermined locations.

10. A method of determining the effectiveness of an end cap location in a retail store by monitoring video data, comprising the steps of:
monitoring and collecting video data at a plurality of end caps using at least one video camera, each of said end caps displaying a product for sale;
tracking with a video camera for a first predetermined period of time for each of the plurality of end caps a total number of guests who pass by each of the plurality of end caps;
determining using the video data for each of the plurality of end caps a first subset of the total number of guests who loiter at each of the plurality of end caps;
determining using the video data an average loiter time for each of the plurality of end caps;
ranking the plurality of end caps according to the average loiter time;
monitoring with at least one video camera and collecting video data for a number of removals of the product for sale at each of the plurality of end caps;
wherein tracking each first subset of the total number of guests who loiter at each of the plurality of end caps further comprises defining a loiter-time subset of each first subset, wherein each loiter-time subset is determined by average loiter times of those guests in each first subset who loiter for a period of time exceeding a predetermined loiter time;
determining the effectiveness of the end caps based on said first subset and each loiter-time subset by comparing sales of said product for sale displayed at each end caps;
changing the product for sale displayed at each of the plurality of end caps;
tracking, for a subsequent second predetermined period of time equal in length to the first predetermined period of time, with a video camera for each of the plurality of end caps, a total number of guests who pass by each of the plurality of end caps during the second predetermined period of time;
tracking for each of the plurality of end caps a second subset of the total number of guests who loiter at each of the plurality of end caps during the second predetermined period of time;
determining a second average loiter time for each of the plurality of end caps;
ranking the plurality of end caps according to the second average loiter time, monitoring a number of removals of the product for sale at each of the plurality of end caps during the second predetermined period of time;

wherein tracking each second subset of the total number of guests who loiter at each of the plurality of end caps during the second predetermined period of time further comprises defining a second loiter-time subset of each second subset, wherein each second loiter-time subset is determined by averaging loiter times of those guests in each second subset who loiter for a period of time exceeding a predetermined loiter time; and comparing sales of the products at the end caps during the first predetermined period of time to the sales of the products at the end caps during the second predetermined period of time to determine the effectiveness of the location of the end caps on sales of the products;

determining by using facial recognition software on the collected video data for each customer who dwells at at least one of the end caps during each of the first predetermined period of time and the second predetermined period of time whether the customer is viewing the product for sale at the end cap or is dwelling for a reason unrelated to the product for sale at the end caps; and ignoring each customer dwelling for a reason unrelated to the product for sale.

11. The method of claim 10, wherein determining a first average loiter time further comprises averaging the loiter times for each guest of the first sub set.

12. The method of claim 10, wherein determining a first average loiter time further comprises:

ignoring those guests who are loitering at the plurality of end caps for a reason unrelated to the product for sale at the plurality of end caps in determining the first average loiter time.

13. The method of claim 10, further comprising the steps of:

placing a first product for sale at a first one of said plurality of end caps for said first predetermined period of time;

placing a second product for sale at said first one of said plurality of end caps for said second predetermined period of time, wherein said first product is a competitive product to said second product; and comparing sales of said first product with said second product during said first predetermined period of time and during said second predetermined period of time.

14. The method of claim 10, further comprising the step of:

monitoring using the video cameras during each of the first and the second predetermined periods of time and collecting data on a number of removals of the product for sale at each of the plurality of end caps.

15. The method of claim 9, further comprising the step of:

calculating a conversion factor for each of the plurality of end caps during each of the first predetermined period of time and the second predetermined period of time based on the comparison of customers dwelling at each of the plurality of end caps and sales of a product displayed at each of the plurality of end caps.

* * * * *